UNITED STATES PATENT OFFICE.

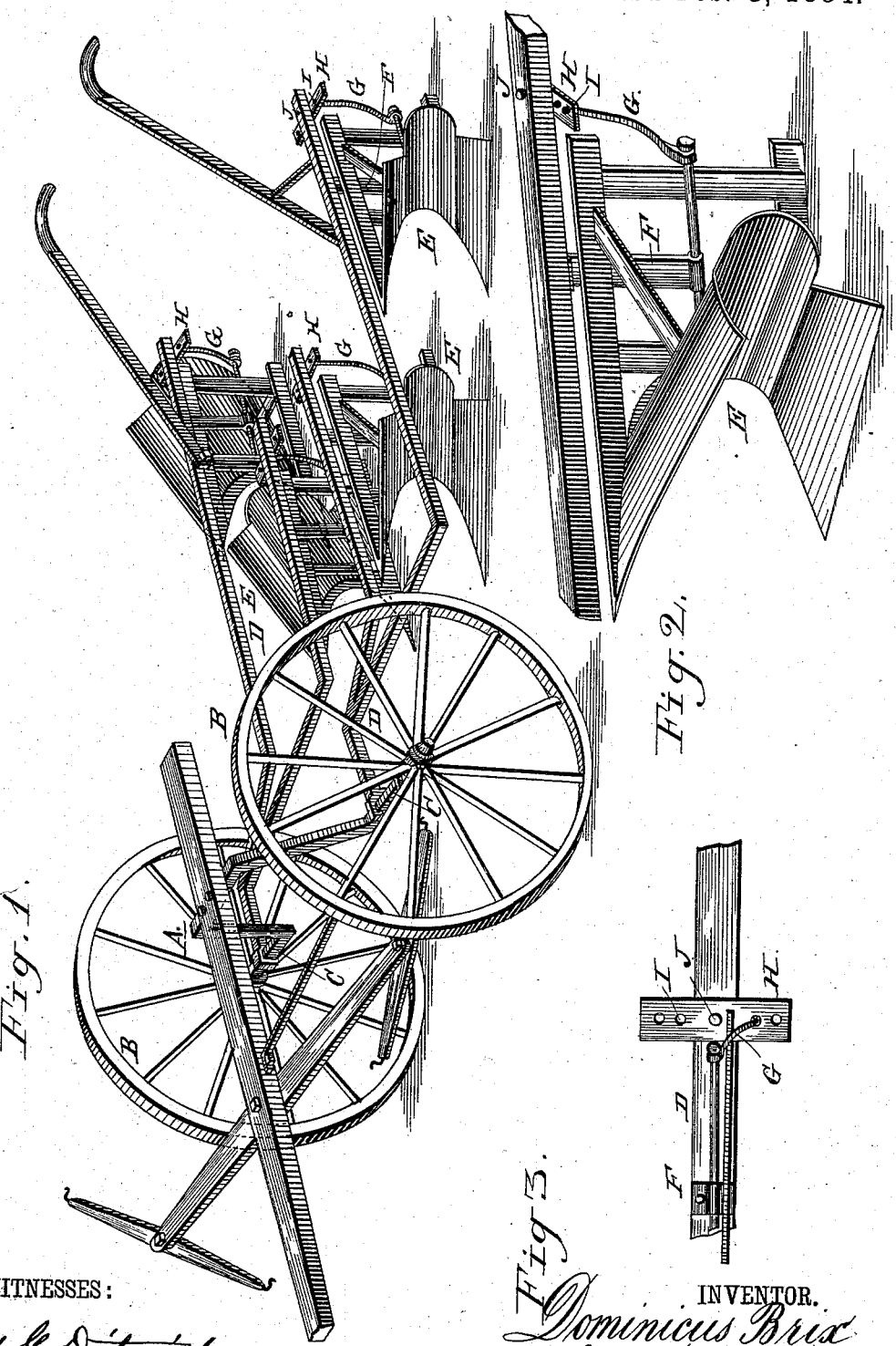

DOMINICUS BRIX, OF GENESEO, ILLINOIS.

CULTIVATOR.

SPECIFICATION forming part of Letters Patent No. 292,979, dated February 5, 1884.

Application filed November 22, 1883. (No model.)

*To all whom it may concern:*

Be it known that I, DOMINICUS BRIX, a citizen of the United States, and a resident of Geneseo, in the county of Henry and State of Illinois, have invented certain new and useful Improvements in Cultivators; and I do hereby declare that the following is a full, clear, and exact description of the invention, such as will enable others skilled in the art to which it appertains to make and use the same, reference being had to the accompanying drawings, which form a part of this specification, and in which—

Figure 1 is a perspective view of my improved cultivator and gang-plow. Fig. 2 is a detail view of one of the plows; and Fig. 3 is a detail view, seen from below, of the means for adjusting the position of the plows.

Similar letters of reference indicate corresponding parts in all the figures.

My invention has relation to plows or cultivators; and it consists in the detailed construction and combination of parts of a sulky plow or cultivator, having means for adjusting the plows in a horizontal plane, as hereinafter more fully described and claimed.

In the accompanying drawings, the letter A indicates the upper frame of the sulky mounted upon wheels B, upon the ends of an upwardly-curved axle C, to the horizontal portions of which the bifurcated plow-beams D are hinged at their forward ends. The one of the bifurcated ends of these beams is shorter than the other—preferably the inner one—and side-hill or turn-wrest plows E, which I prefer to make of the construction described in Patent No. 281,499, granted to Emil Haner on the 17th day of July, 1883, while they may be of any desired construction. The foremost, F, of the standards or hangers which form the bearings at their lower ends, in which the horizontal shaft of the plow-body turns, is pivoted at its upper end upon the under side of the beam, so as to turn in a horizontal plane, and the rearmost, G, of the standards is provided at its upper end with a laterally-projecting flat bar, H, provided with a number of perforations, I, which are adapted to fit upon a downwardly-projecting bolt or lug, J, upon the under side of the beam, so that the plow may be adjusted, turning in a horizontal plane, by changing the perforated bar upon the lug. In this manner the point of the plow may be brought to point inward or outward, as desired, changing the width of the furrow if plowing, and bringing the point of the plow nearer to or farther from the row of plants when cultivating.

The mold-board of the plows may be of iron, steel, or glass, as desired, and it will be seen that by having turn-wrest plows, the plows may be adjusted to throw the dirt toward the plants or from the plants; and by adjusting the plows with the mold-boards all in one direction the plow may be used as a gang-plow.

Having thus described my invention, I claim and desire to secure by Letters Patent of the United States—

In a reversible plow, the combination of the forward standard or hanger, F, pivoted at its upper end to turn on the under side of the plow-beam, the rearmost standard or hanger, G, having a laterally-projecting flat perforated bar upon its upper end, and the plow-beam having means for engaging the perforations in the flat laterally-projecting bar, whereby the point of the plow may be adjusted to or from land, as and for the purpose shown and set forth.

In testimony that I claim the foregoing as my own I have hereunto affixed my signature in presence of two witnesses.

DOMINICUS BRIX.

Witnesses:
F. H. MCARTHUR,
JAMES BRACKEN.